United States Patent
Chen et al.

(10) Patent No.: US 8,421,315 B2
(45) Date of Patent: Apr. 16, 2013

(54) ELECTROSTRICTIVE STRUCTURE INCORPORATING CARBON NANOTUBES AND ELECTROSTRICTIVE ACTUATOR USING THE SAME

(75) Inventors: Lu-Zhuo Chen, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

(*) Notice: Subject to any disclaimer, the term of this patent is extended or adjusted under 35 U.S.C. 154(b) by 265 days.

(21) Appl. No.: 12/907,118

(22) Filed: Oct. 19, 2010

(65) Prior Publication Data

US 2011/0234053 A1     Sep. 29, 2011

(30) Foreign Application Priority Data

Mar. 26, 2010     (CN) .......................... 2010 1 0133308

(51) Int. Cl.
*H01L 41/047* (2006.01)
*H01L 41/16* (2006.01)

(52) U.S. Cl.
USPC .......................... 310/363; 310/365; 310/800

(58) Field of Classification Search .......... 310/363–366, 310/800
See application file for complete search history.

(56) References Cited

U.S. PATENT DOCUMENTS

| | | | |
|---|---|---|---|
| 7,045,108 B2 | 5/2006 | Jiang et al. | |
| 2004/0096607 A1* | 5/2004 | Kelley et al. | 428/35.3 |
| 2005/0168113 A1* | 8/2005 | Hirai et al. | 310/800 |
| 2007/0120444 A1 | 5/2007 | Kato et al. | |
| 2007/0241641 A1 | 10/2007 | Kato et al. | |
| 2007/0295714 A1 | 12/2007 | Liu et al. | |
| 2008/0063860 A1* | 3/2008 | Song et al. | 428/336 |
| 2008/0248235 A1 | 10/2008 | Feng et al. | |
| 2008/0280137 A1* | 11/2008 | Ajayan et al. | 428/375 |
| 2008/0299031 A1 | 12/2008 | Liu et al. | |
| 2009/0092813 A1 | 4/2009 | Lin et al. | |
| 2009/0096348 A1 | 4/2009 | Liu et al. | |
| 2009/0289203 A1 | 11/2009 | Jiang et al. | |
| 2009/0314510 A1* | 12/2009 | Kukowski et al. | 174/69 |

FOREIGN PATENT DOCUMENTS

| | | |
|---|---|---|
| CN | 101090586 A | 12/2007 |
| CN | 101409999 A | 4/2009 |
| CN | 101585533 A | 11/2009 |
| JP | 2007-146799 | 6/2007 |
| JP | 2009-94074 | 4/2009 |
| WO | WO2007015710 | 2/2007 |
| WO | WO 2009/138522 A2 * | 11/2009 |

* cited by examiner

*Primary Examiner* — Thomas Dougherty
(74) *Attorney, Agent, or Firm* — Altis Law Group, Inc.

(57) ABSTRACT

An electrostrictive structure includes a flexible polymer matrix and a carbon nanotube film structure at least partly embedded into the flexible polymer matrix. The carbon nanotube film structure includes a number of carbon nanotubes combined by van der Waals attractive force therebetween. The carbon nanotube film structure extends in a curve in the flexible polymer matrix.

18 Claims, 11 Drawing Sheets

ELECTROSTRICTIVE STRUCTURE INCORPORATING CARBON NANOTUBES AND ELECTROSTRICTIVE ACTUATOR USING THE SAME

RELATED APPLICATIONS

This application claims all benefits accruing under 35 U.S.C. §119 from China Patent Application No. 201010133308.5, filed on Mar. 26, 2010 in the China Intellectual Property Office, hereby incorporated by reference.

BACKGROUND

1. Technical Field

The present disclosure relates to electrostrictive structures, and particularly, to an electrostrictive structure incorporating carbon nanotubes and an electrostrictive actuator using the same.

2. Description of Related Art

An actuator is a device that converts input energy to mechanical output energy. For example, actuators can be classified into electrostatic, electromagnetic, and electrothermic type actuators.

A typical electrothermic type actuator has a double-layer structure and includes two metallic layers having different thermal expansion coefficients. When a current is applied, the electrothermic type actuator bends because the thermal expansion coefficients of the two metallic layers are different. However, the electrothermic type actuator has a slow thermal response.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
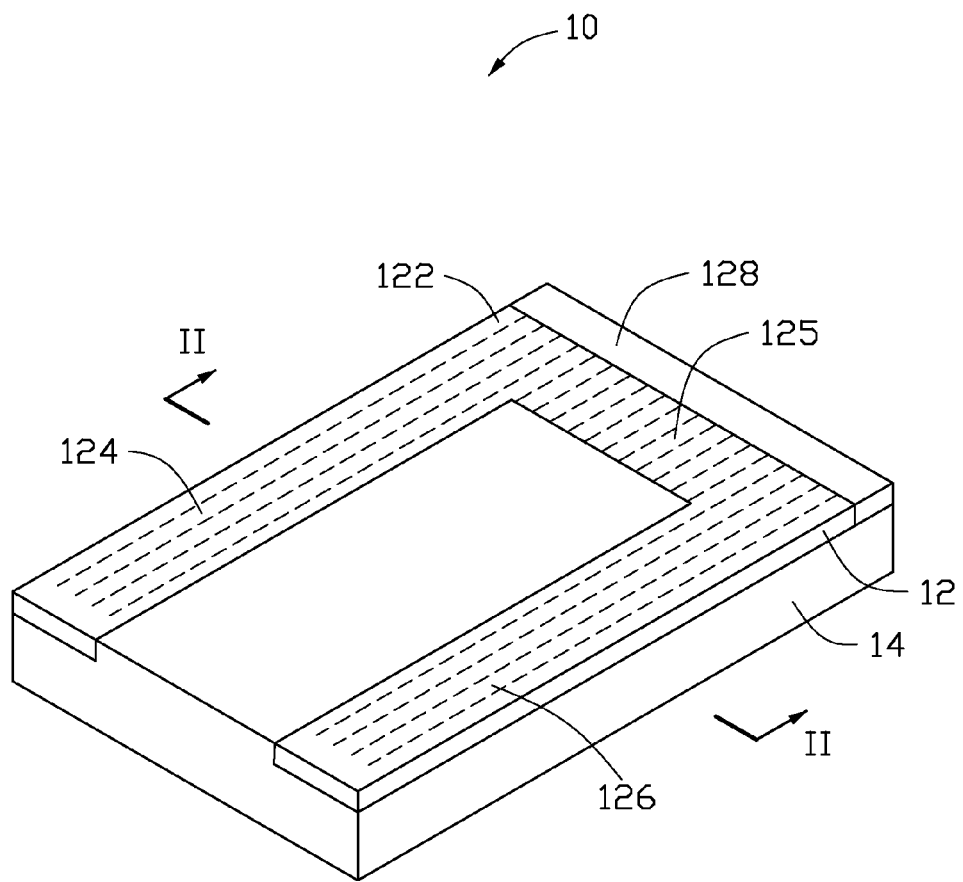
FIG. 1 is an isometric view of one embodiment of an electrostrictive structure.
Figure 2:
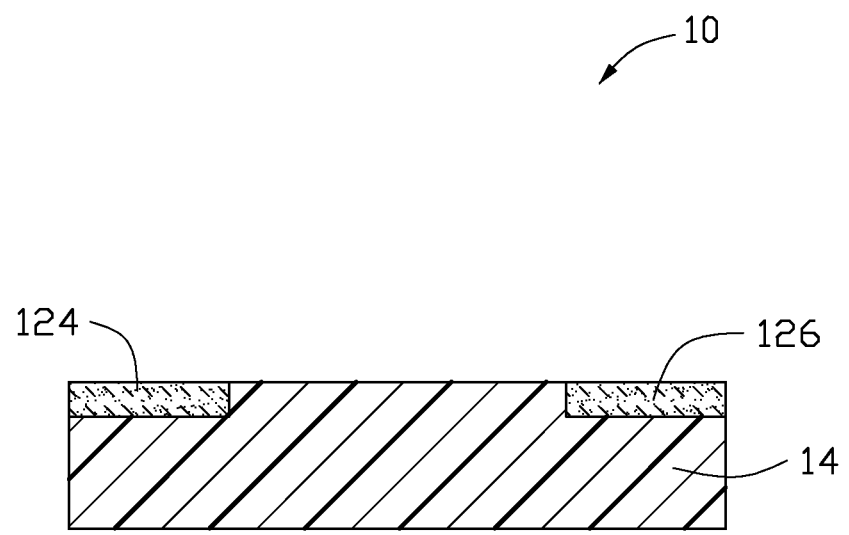
FIG. 2 is a cross-sectional view, taken along a line II-II of FIG. 1.

Referring to FIG. 1 and FIG. 2, one embodiment of an electrostrictive structure 10 is a sheet. The electrostrictive structure 10 includes a flexible polymer matrix 14 and a carbon nanotube film structure 12. The carbon nanotube film structure 12 has a thermal expansion coefficient less than that of the flexible polymer matrix 14. The carbon nanotube film structure 12 can be disposed on one surface of the flexible polymer matrix 14. A thickness of the electrostrictive structure 10 can range from about 20 micrometers to about 5 millimeters.

The flexible polymer matrix 14 can be a sheet having a thickness ranging from about 20 micrometers to about 5 millimeters. The shape of the flexible polymer matrix 14 is not limited and may be, for example, round or rectangular (shown in FIG. 1), and have other ranges of thickness. A material of the flexible polymer matrix 14 can be silicone elastomer, poly methyl methacrylate, polyurethane, epoxy resin, polypropylene acid ethyl ester, acrylic acid ester, polystyrene, polybutadiene, polyacrylonitrile, polyaniline, polypyrrole, polythiophene or combinations thereof. In one embodiment, the flexible polymer matrix 14 can be a rectangular plate made of silicone elastomer with a thickness of about 0.7 millimeters, a length of about 60 millimeters, and a width of about 30 millimeters.

In one embodiment, the carbon nanotube film structure 12 can be at least partly embedded into the flexible polymer matrix 14 through the surface of the flexible polymer matrix 14. The carbon nanotube film structure 12 can include a plurality of micropores and the flexible polymer matrix 14 can permeate the micropores of the carbon nanotube film structure 12. In some embodiments, the carbon nanotube film structure 12 and the flexible polymer matrix 14 can be combined through steps including: (1) putting the carbon nanotube film structure 12 on the flexible polymer matrix 14 which is in a viscous-liquid state; and (2) solidifying the flexible polymer matrix 14 after material of the flexible polymer matrix 14 has permeated the micropores of the carbon nanotube film structure 12. The carbon nanotube film structure 12 and the flexible polymer matrix 14 can have good binding properties because material of the flexible polymer matrix 14 has permeated in the micropores of the carbon nanotube film structure 12. Alternatively, the entire carbon nanotube film structure 12 can be attached on a surface of the flexible polymer matrix 14.

After the carbon nanotube film structure 12 has combined with the flexible polymer matrix 14, the carbon nanotube film structure 12 can be substantially parallel to and offset from a central plane in a thickness direction of the flexible polymer matrix 14. In the embodiment shown in FIGS. 1-2, the top surface of the carbon nanotube film structure 12 is coplanar with the top surface of the flexible polymer matrix 14. Furthermore, the ratio between the thickness of the carbon nanotube film structure 12 and the flexible polymer matrix 14 can be between about 1:200 to about 1:5. In one embodiment, the ratio between the thickness of the carbon nanotube film structure 12 and the flexible polymer matrix 14 can be between about 1:25 to about 1:20.

Figure 3:
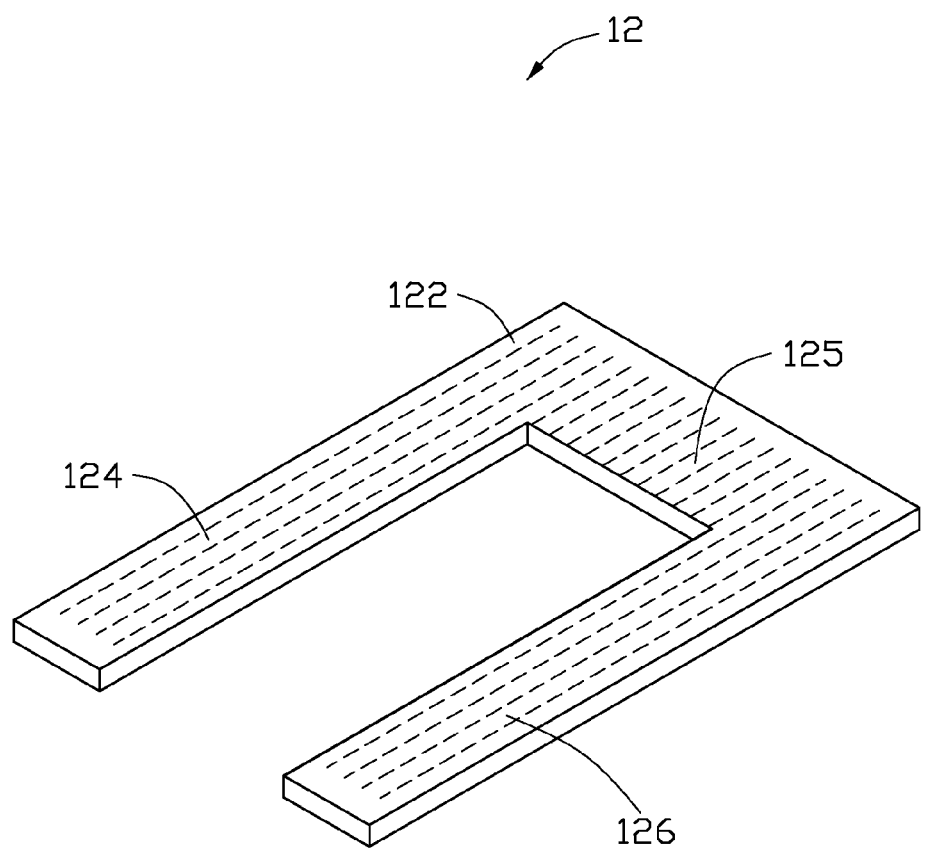
FIG. 3 is an isometric view of a carbon nanotube film structure of FIG. 1.

Referring also to FIG. 3, the carbon nanotube film structure 12 can extend along a curve on the surface of the flexible polymer matrix 14, and can be divided into a first portion 124, a second portion 126, and a connecting portion 125. The first portion 124 and the second portion 126 are separated from each other. The connecting portion 125 can connect one end of the first portion 124 to one end of the second portion 126, such that the first portion 124, the second portion 126, and the connecting portion 125 together can define a U shape. Each of the first portion 124 and the second portion 126 can be connected to an electrode, such that at least one conductive path can be substantially defined from the first portion 124, through the connecting portion 125, to the second portion 126.

The first portion 124, the second portion 126, and the connecting portion 125 can be formed by cutting one carbon nanotube film or a plurality of stacked carbon nanotube films into a desired shape. The carbon nanotube film can be a drawn carbon nanotube film, a flocculated carbon nanotube film, or a pressed carbon nanotube film. The carbon nanotube film structure 12 can include one drawn carbon nanotube film, one flocculated carbon nanotube film, one pressed carbon nanotube film, or combinations thereof. Some examples of the drawn carbon nanotube film, the flocculated carbon nanotube film, and pressed carbon nanotube film are described below.

Drawn Carbon Nanotube Film

Figure 4:
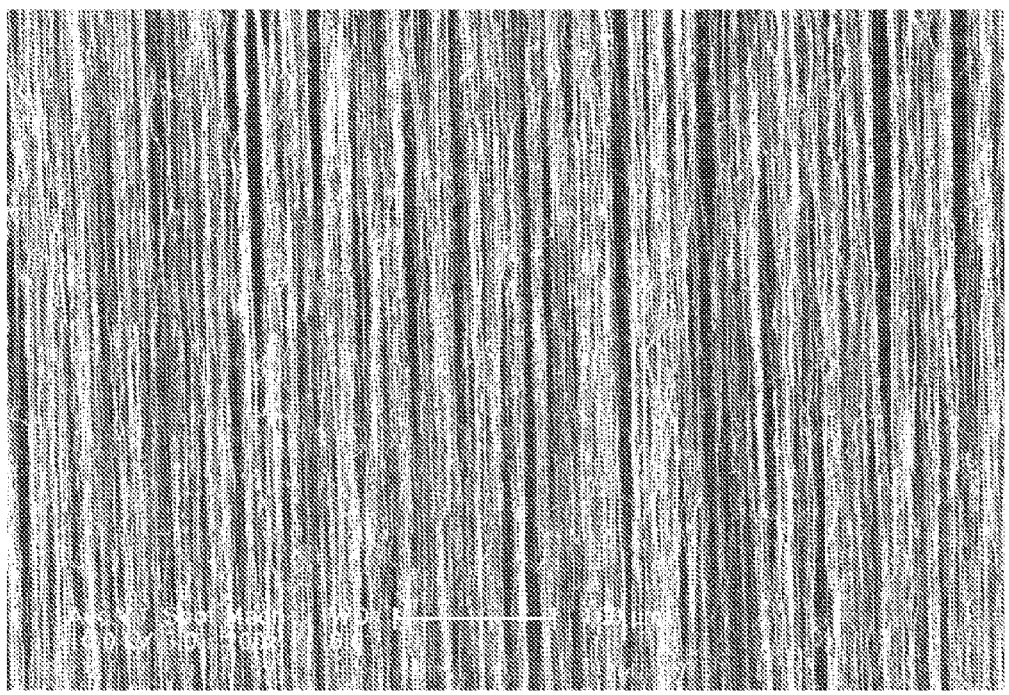
FIG. 4 is a Scanning Electron Microscope (SEM) image of a drawn carbon nanotube film.

In one embodiment, the carbon nanotube film structure 12 includes at least one drawn carbon nanotube film. A film can be drawn from a carbon nanotube array, to obtain a drawn carbon nanotube film. Examples of drawn carbon nanotube films are taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The drawn carbon nanotube film is a free-standing film. Each drawn carbon nanotube film can include a plurality of successively oriented carbon nanotube segments joined end-to-end by van der Waals attractive force therebetween. Each carbon nanotube segment can include a plurality of carbon nanotubes 122 substantially parallel to each other, and combined by van der Waals attractive force therebetween. As can be seen in FIG. 4, some variations can occur in the drawn carbon nanotube film. The carbon nanotubes 122 in the drawn carbon nanotube film are substantially oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 µm.

In other embodiments, the carbon nanotube film structure 12 can include two or more coplanar carbon nanotube films, and can include layers of coplanar carbon nanotube films. Additionally, if the carbon nanotubes in the carbon nanotube film are aligned along one preferred orientation (e.g., the drawn carbon nanotube film), an angle can exist between the orientations of carbon nanotubes in adjacent films, whether stacked or arrayed side by side. Adjacent carbon nanotube films can be combined by just the van der Waals attractive force therebetween. The number of layers of the carbon nanotube films is not limited. An angle between the aligned directions of the carbon nanotubes in two adjacent carbon nanotube films can range from about 0 degrees to about 90 degrees. The carbon nanotube film structure 12 in an embodiment employing these films will have a plurality of micropores. Stacking the carbon nanotube films will also add to the structural integrity of the carbon nanotube film structure 12.

Flocculated Carbon Nanotube Film

Figure 5:
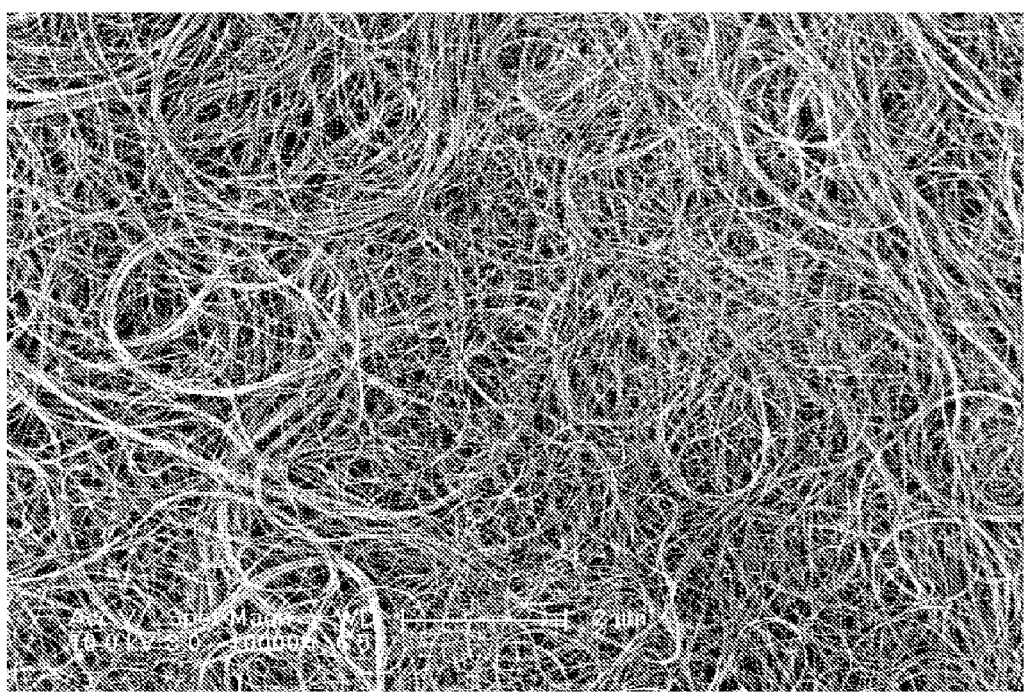
FIG. 5 is an SEM image of a flocculated carbon nanotube film.

In other embodiments, the carbon nanotube film structure 12 can include a flocculated carbon nanotube film. Referring to FIG. 5, the flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is understood that the flocculated carbon nanotube film is very porous. The sizes of the micropores can be less than 10 µm. The porous nature of the flocculated carbon nanotube film will increase the specific surface area of the carbon nanotube film structure. Further, because the carbon nanotubes in the carbon film nanotube structure 12 are entangled with each other, the carbon nanotube film structure 12 employing the flocculated carbon nanotube film has excellent durability, and can be fashioned into desired shapes with a low risk to the integrity of the carbon nanotube film structure 12. The thickness of the flocculated carbon nanotube film can range from about 0.5 nm to about 1 mm.

Pressed Carbon Nanotube Film

Figure 6:
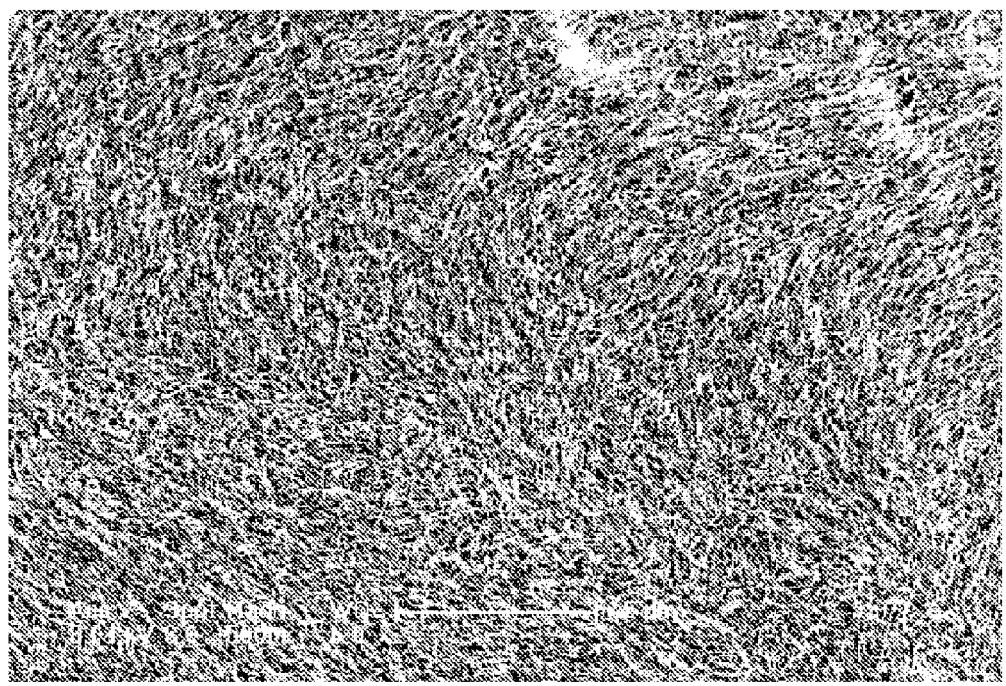
FIG. 6 is an SEM image of a pressed carbon nanotube film.

In other embodiments, the carbon nanotube film structure 12 can include a pressed carbon nanotube film. Referring to FIG. 6, the pressed carbon nanotube film can be a free-standing carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube film structure 12 can be isotropic. Here, "isotropic" means the carbon nanotube film has properties substantially identical in all directions substantially parallel to a surface of the carbon nanotube film. The thickness of the pressed carbon nanotube film ranges from about 0.5 nm to about 1 mm. An example of pressed carbon nanotube film is taught by US PGPub. 20080299031A1 to Liu et al.

In the embodiment of FIGS. 1-3, the carbon nanotube film structure 12 includes a plurality of drawn carbon nanotube films stacked together. The carbon nanotubes of each drawn carbon nanotube film can be substantially aligned along one preferred orientation. Further, the carbon nanotubes of the drawn carbon nanotube films can be substantially aligned along one preferred orientation. Each of the first portion 124 and the second portion 126 can be a long strip which has a longitudinal direction substantially parallel to the preferred orientation. The connecting portion 125 can be a long strip which has a longitudinal direction substantially perpendicular to the preferred orientation.

The operating principle of the electrostrictive structure 10 is as follows. When a voltage is applied to the carbon nanotube film structure 12 via the first portion 124 and the second portion 126, a current flows through the carbon nanotube film structure 12. The carbon nanotubes 122 convert the electric energy to heat thereby heating and expanding the flexible polymer matrix 14. The thermal expansion coefficients of the flexible polymer matrix 14 and the carbon nanotube film structure 12 are different so that the electrostrictive structure 10 bends in a direction oriented to the carbon nanotube film structure 12 which has a smaller thermal expansion coefficient.

The expansion coefficient of the electrostrictive structure 10 with an original length of about 34 millimeters, an original thickness of about 0.7 millimeters, and an original width of about 5 millimeters is tested. The carbon nanotube film structure 12 has a thickness of about 20 micrometers. A first side of the electrostrictive structure 10 where the free ends of the first portion 124 and the second portion 126 are located is fixed. A second side of the electrostrictive structure 10 where the connecting portion 125 is located can move freely in the thickness direction of the electrostrictive structure 10. After about 40 volts is applied to the electrostrictive structure 10 for about 12 seconds, the second side of the electrostrictive structure 10 moves about 16 millimeters in the thickness direction of the electrostrictive structure 10.

In one embodiment, each of the flexible polymer matrix 14 and the carbon nanotube film structure 12 can have a U-shape. The carbon nanotube film structure 12 can be stacked on the flexible polymer matrix 14 with or without material of the flexible polymer matrix 14 permeating the carbon nanotube film structure 12. The flexible polymer matrix 14 and the carbon nanotube film structure 12 together have a U shape outer configuration.

In order to increase the conductivity of the connecting portion 125, a conductivity enhancement layer 128 can be provided on the second side of the electrostrictive structure 10. The conductivity enhancement layer 128 at least partly covers the connecting portion 125. The conductivity enhancement layer 128 can be made of metals having good conductivity, such as gold, platinum, palladium, silver, copper and iron. The conductivity enhancement layer 128 can also be conductive adhesive, such as silver glue.

Figure 7:
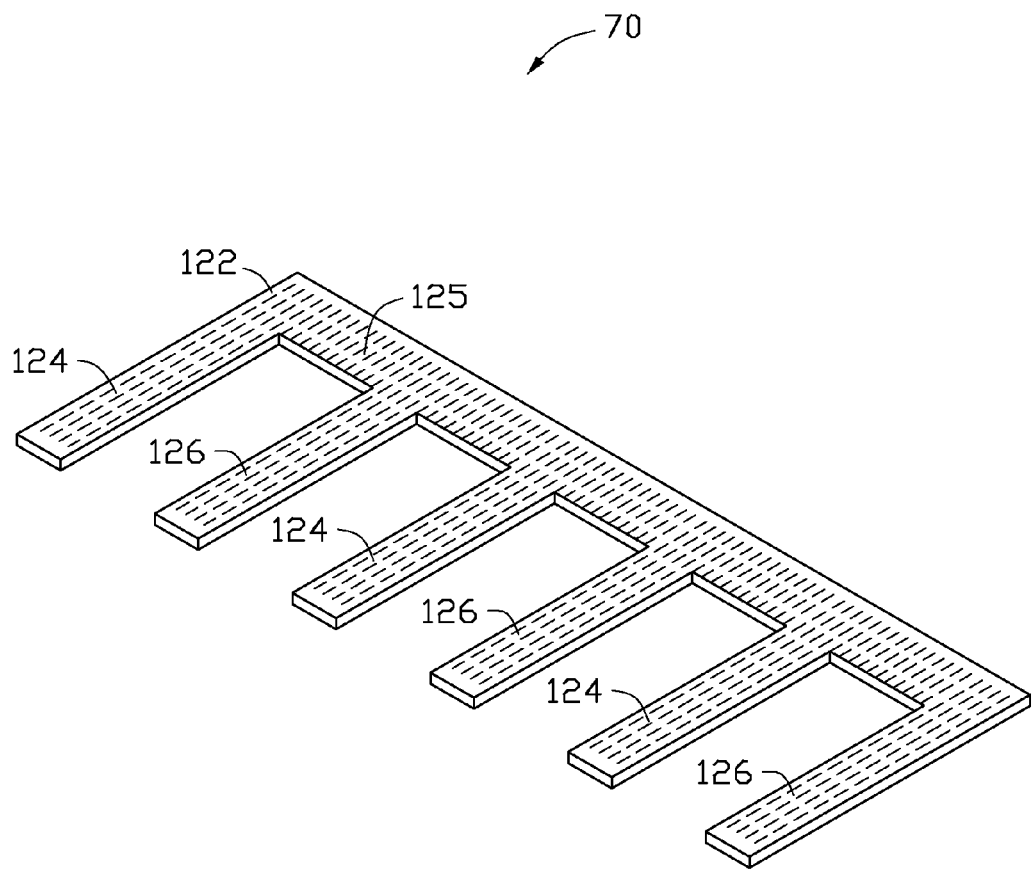
FIG. 7 is an isometric view of another embodiment of a carbon nanotube film structure of an electrostrictive structure.

FIG. 7 is a schematic view of another embodiment of a carbon nanotube film structure 70 of an electrostrictive structure. The carbon nanotube film structure 70 is similar to the carbon nanotube film structure 12, except that the carbon nanotube film structure 70 includes a plurality of first portions 124 and a plurality of second portions 126. The first portions 124 and the second portions 126 are alternatively positioned at a same side of the connecting portion 125 at desired intervals. The first portions 124 and the second portions 126 extend from the connecting portion 125 along a same direction substantially perpendicular to the longitudinal direction of the connecting portion 125. The first portions 124 can be connected to positive electrodes, and the second portions 126 can be connected to negative electrodes.

Figure 8:
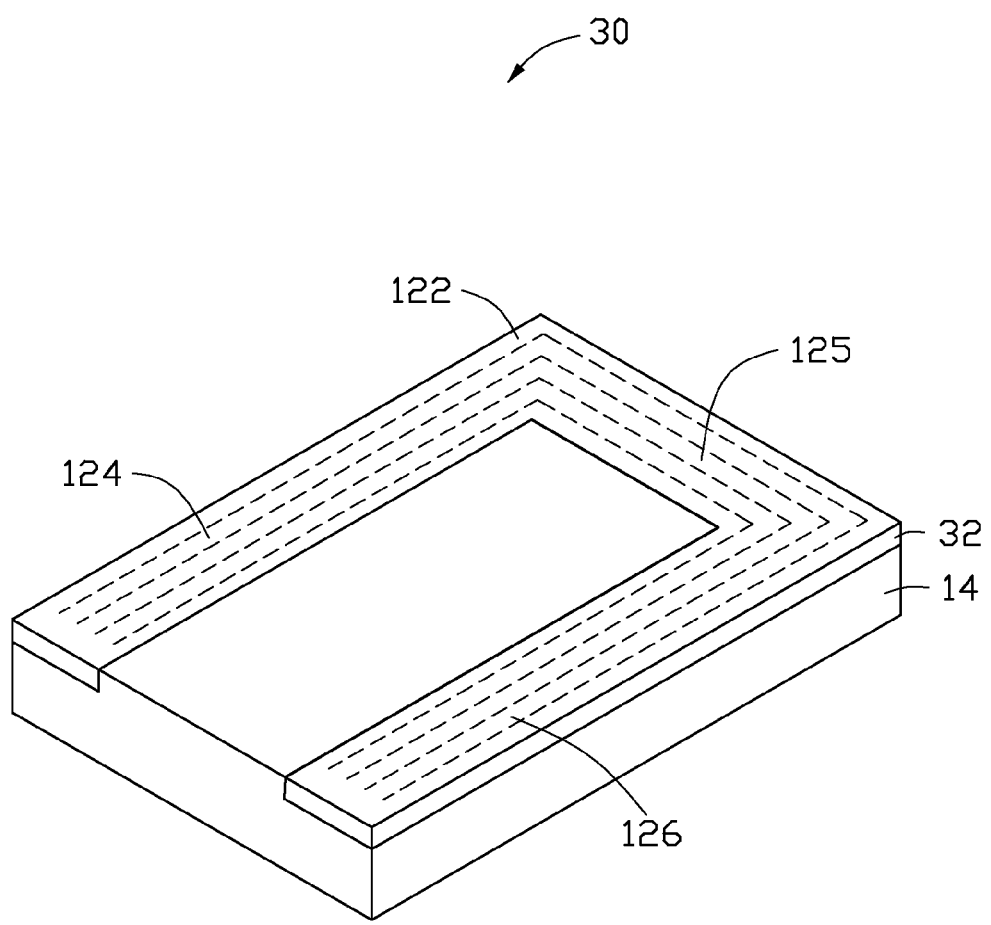
FIG. 8 is an isometric view of yet another embodiment of an electrostrictive structure.

Referring to FIG. 8, one embodiment of an electrostrictive structure 30 is shown. The electrostrictive structure 30 is similar to the electrostrictive structure 10, except that the carbon nanotubes of the carbon nanotube film structure 32 are aligned along different directions. The carbon nanotubes in the connecting portion 125 of the carbon nanotube film structure 32 are substantially aligned along a first direction from the first portion 124 to the second portion 126 of the carbon nanotube film structure 32. The carbon nanotubes in the first portion 124 and the second portion 126 of the carbon nanotube film structure 32 are substantially aligned along a second direction. The second direction is not parallel to the first direction. In the embodiment shown in FIG. 8, the first direction can be substantially perpendicular to the second direction. In the carbon nanotube film structure 32, carbon nanotubes are joined end-to-end by van der Waals attractive force therebetween and extend continuously along the first portion 124, through the connecting portion 125, to the second portion 126.

In one embodiment, the carbon nanotube film structure 32 and the flexible polymer matrix 14 can be combined through steps including: (1) putting one drawn carbon nanotube film on the flexible polymer matrix 14 which is in a viscous-liquid state; and (2) solidifying the flexible polymer matrix 14 after material of the flexible polymer matrix 14 has permeated in the micropores of the drawn carbon nanotube film. In step (1), after one portion of the drawn carbon nanotube film has been put on the flexible polymer matrix 14 to form the first portion 124, the drawn carbon nanotube film is bent about 90 degrees and then put on the flexible polymer matrix 14 to form the connecting portion 125. After the connecting portion 125 has been formed, the drawn carbon nanotube film is further bent about 90 degrees and then put on the flexible polymer matrix 14 to form the second portion 126. Alternatively, a plurality of drawn carbon nanotube films can be put on the flexible polymer matrix 14, which is in a viscous-liquid state, in the form of a U shape. The flexible polymer matrix 14 is then solidified after material of the flexible polymer matrix 14 has permeated the micropores of the drawn carbon nanotube films.

Figure 9:
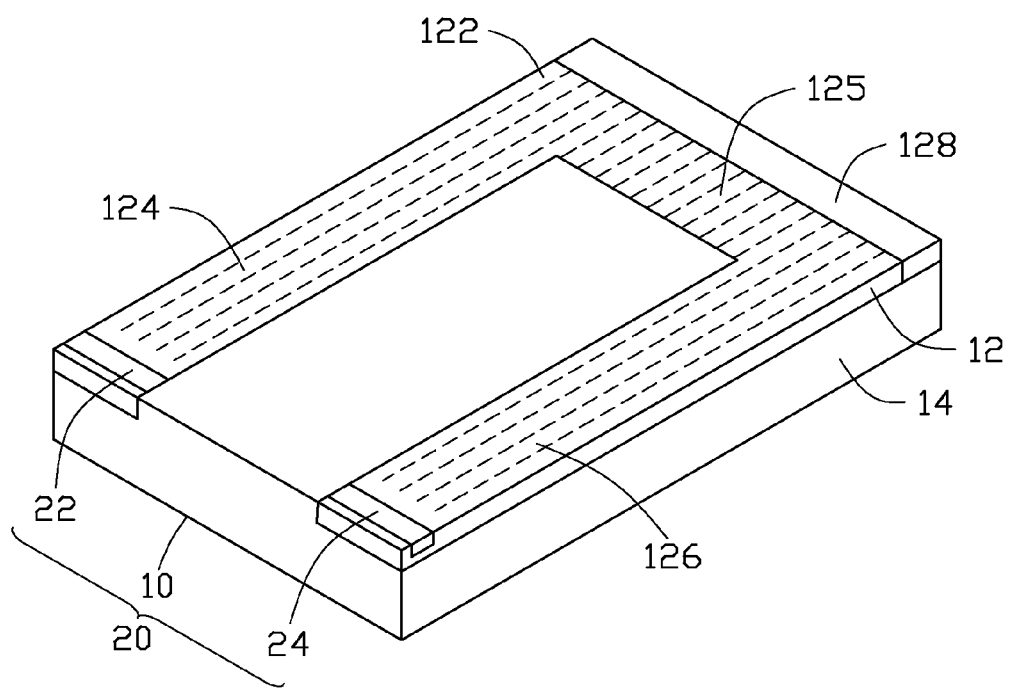
FIG. 9 is an isometric view of one embodiment of an electrostrictive actuator.

Referring to FIG. 9, one embodiment of an electrostrictive actuator 20 includes the electrostrictive structure 10, a first electrode 22, and a second electrode 24. The first electrode 22 is electrically connected to the first portion 124. The second electrode 24 is electrically connected to the second portion 126. In one embodiment, each of the first electrode 22 and the second electrode 24 can be a copper sheet.

During operation of the electrostrictive actuator 20, a voltage is applied to the first electrode 22 and the second electrode 24, causing a current to flow through the carbon nanotube film structure 12. The carbon nanotubes 122 convert the electric energy to heat thereby heating and expanding the flexible polymer matrix 14. The thermal expansion coefficients of the flexible polymer matrix 14 and the carbon nanotube film structure 12 are different so that the electrostrictive structure 10 bends in a direction oriented to the carbon nanotube film structure 12 which has a smaller thermal expansion coefficient.

Figure 10:
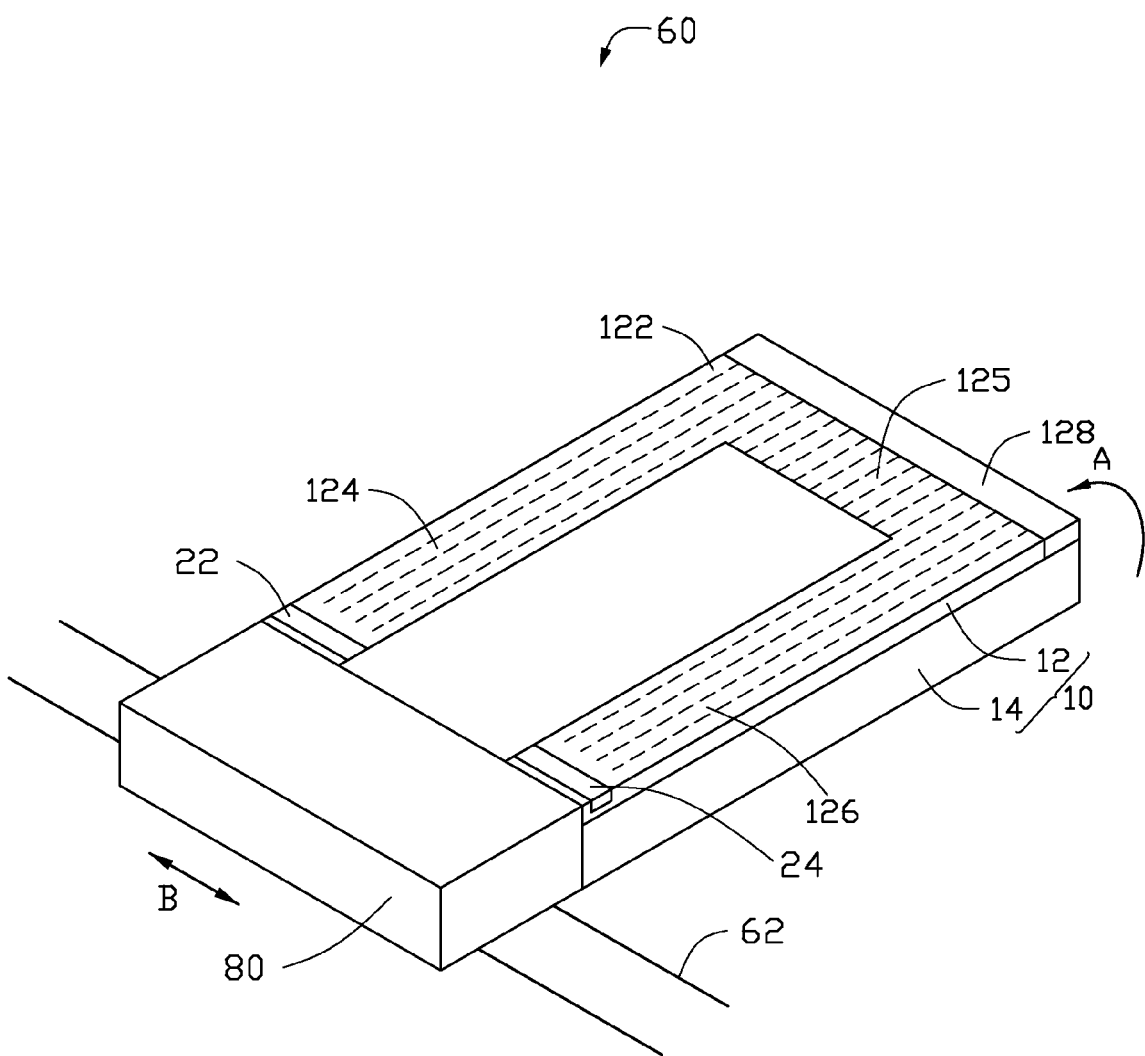
FIG. 10 is similar to FIG. 9 except for the addition of an installation portion.

Referring to FIG. 10, one embodiment of an electrostrictive actuator 60 is shown. The electrostrictive actuator 60 is similar to the electrostrictive actuator 20 except for the addition of an installation portion 80.

The first side of the electrostrictive structure 10 where the first electrode 22 and the second electrode 24 are located, is installed in the installation portion 80. The second side of the electrostrictive structure 10 where the connecting portion 125 is located can move freely in the thickness direction of the electrostrictive structure 10. After a voltage is applied to the electrostrictive structure 10, the second side of the electrostrictive structure 10 can move or rotate relatively to and towards the installation portion 80 along the direction indicated by the arrow A shown in FIG. 10.

In one embodiment, the installation portion 80 can be a clamp which can clamp onto the first side of the electrostrictive structure 10. In one embodiment, the installation portion 80 can be integratedly formed with the flexible polymer matrix 14. In one embodiment, the installation portion 80 can be firmly fixed to one place. In one embodiment, the installation portion 80 can move from one place to another desired place along the direction indicated by the arrow B shown in FIG. 10 by sliding on a slideway 62.

Figure 11:
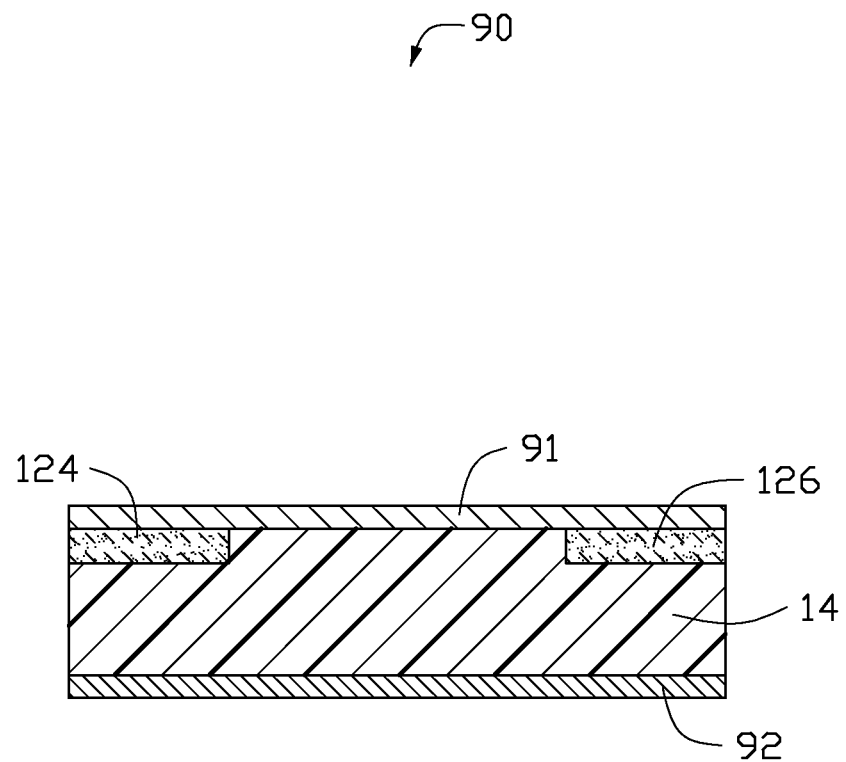
FIG. 11 is a cross-sectional view of still yet another embodiment of an electrostrictive structure.

FIG. 11 is a schematic view of another embodiment of an electrostrictive structure 90. The electrostrictive structure 90 is similar to the electrostrictive structure 10 shown in FIG. 2, except for the addition of a first flexible thermal insulation layer 91 and a second flexible thermal insulation layer 92. In one embodiment, each of the first flexible thermal insulation layer 91 and the second flexible thermal insulation layer 92 can be made of flexible thermal insulation composite fabric. The first flexible thermal insulation layer 91 and the second flexible thermal insulation layer 92 can be located on opposite surfaces of the flexible polymer matrix 14, such that the flexible polymer matrix 14 and the carbon nanotube film structure 12 are located between the first flexible thermal insulation layer 91 and the second flexible thermal insulation layer 92. In one embodiment, the first flexible thermal insulation layer 91 and the second flexible thermal insulation layer 92 can be the outermost surfaces of the electrostrictive structure 90.

The first flexible thermal insulation layer 91 and the second flexible thermal insulation layer 92 can be used to prevent radiation of the heat generated by the carbon nanotube film structure 12. Therefore, by the presence of the first flexible thermal insulation layer 91 and the second flexible thermal insulation layer 92, the heat generated by the carbon nanotube film structure 12 can be efficiently used to heat the flexible polymer matrix 14.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An electrostrictive structure comprising:
   a flexible polymer matrix; and
   a carbon nanotube film structure at least partly embedded into the flexible polymer matrix, the carbon nanotube film structure comprising a plurality of carbon nanotubes combined by van der Waals attractive force therebetween;
   wherein the carbon nanotube film structure extends along a curve in the flexible polymer matrix, the carbon nanotube film structure is substantially parallel to and offset from a central plane of the flexible polymer matrix; and the carbon nanotube film structure comprises a first portion, a second portion, and a connecting portion, connecting the first portion to the second portion.

2. The electrostrictive structure of claim 1, wherein the first portion, the second portion and the connecting portion together define a U shape.

3. The electrostrictive structure of claim 2, wherein the plurality of carbon nanotubes are substantially aligned along a preferred orientation parallel to a longitudinal direction of the first portion.

4. The electrostrictive structure of claim 3, further comprising a conductivity enhancement layer electrically connecting to the connecting portion.

5. The electrostrictive structure of claim 4, wherein the conductivity enhancement layer at least partly covers the connecting portion.

6. The electrostrictive structure of claim 2, wherein most of the plurality of carbon nanotubes in the first portion and the second portion are substantially aligned along a first preferred orientation, and most of the plurality of carbon nanotubes in the connecting portion are substantially aligned along a second preferred orientation crossing with the first preferred orientation.

7. The electrostrictive structure of claim 6, wherein the first preferred orientation is substantially perpendicular to the second preferred orientation.

8. The electrostrictive structure of claim 1, wherein the carbon nanotube film structure comprises a plurality of first portions, a plurality of second portions, and a connecting portion, the plurality of first portions and the plurality of second portions being alternatively positioned at a same side of the connecting portion at interval.

9. The electrostrictive structure of claim 8, wherein the plurality of first portions and the plurality of second portions extend from the connecting portion along a substantially same direction substantially perpendicular to a longitudinal direction of the connecting portion.

10. The electrostrictive structure of claim 1, further comprising a first flexible thermal insulation layer and a second flexible thermal insulation layer located on opposite surfaces of the flexible polymer matrix, wherein the flexible polymer matrix and the carbon nanotube film structure are located between the first flexible thermal insulation layer and the second flexible thermal insulation layer.

11. The electrostrictive structure of claim 10, wherein the first flexible thermal insulation layer and the second flexible thermal insulation layer form the outermost surfaces of the electrostrictive structure.

12. The electrostrictive structure of claim 1, wherein the carbon nanotube film structure comprises a drawn carbon nanotube film, a flocculated carbon nanotube film, a pressed carbon nanotube film, or combinations thereof.

13. An electrostrictive actuator comprising:
   a flexible polymer matrix;
   a first electrode located on the flexible polymer matrix;
   a second electrode located on the flexible polymer matrix and spaced from the first electrode;
   a carbon nanotube film structure at least partly embedded into the flexible polymer matrix, the carbon nanotube film structure comprising a plurality of carbon nanotubes combined by van der Waals attractive force therebetween; wherein the carbon nanotube film structure extends from the first electrode to the second electrode along a curve.

14. The electrostrictive actuator of claim 13, further comprising an installation portion, wherein the flexible polymer matrix has a first side installed in the installation portion, and the first electrode and the second electrode are located on the first side of the flexible polymer matrix.

15. The electrostrictive actuator of claim 14, further comprising a slideway, wherein the installation portion is slidably mounted on the slideway.

16. The electrostrictive actuator of claim 14, further comprising a first flexible thermal insulation layer and a second flexible thermal insulation layer located on opposite surfaces of the flexible polymer matrix, wherein the flexible polymer matrix and the carbon nanotube film structure are located between the first flexible thermal insulation layer and the second flexible thermal insulation layer, and the installation portion is located at a lateral side of the first flexible thermal insulation layer and the second flexible thermal insulation layer.

17. The electrostrictive actuator of claim 14, wherein the carbon nanotube film structure comprises a drawn carbon nanotube film, a flocculated carbon nanotube film, a pressed carbon nanotube film, or combinations thereof.

18. The electrostrictive actuator of claim 17, wherein the carbon nanotube film structure is substantially parallel to and offset from a central plane of the flexible polymer matrix.

* * * * *